US006851470B2

United States Patent
Laukhuf

(10) Patent No.: US 6,851,470 B2
(45) Date of Patent: Feb. 8, 2005

(54) AIR MIXING SYSTEM FOR AUXILIARY VEHICLE HVAC UNITS

(75) Inventor: Rodney A. Laukhuf, Haviland, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/154,132

(22) Filed: May 23, 2002

(65) Prior Publication Data

US 2003/0217839 A1 Nov. 27, 2003

(51) Int. Cl.[7] .................................................. B60H 3/00
(52) U.S. Cl. ........................ 165/202; 165/43; 454/75
(58) Field of Search ............................. 165/41, 42, 43, 165/202, 203; 454/69, 75

(56) References Cited

U.S. PATENT DOCUMENTS

| | | | | |
|---|---|---|---|---|
| 2,009,823 A | * | 7/1935 | Van Vulpen et al. ... | 165/202 X |
| 2,027,097 A | * | 1/1936 | Hanson ........................ | 165/43 |
| 2,053,206 A | * | 9/1936 | Sargent ..................... | 165/43 X |
| 2,134,724 A | * | 11/1938 | McClanahan et al. ........ | 165/43 |
| 2,170,991 A | * | 8/1939 | Grady ......................... | 165/43 |
| 2,180,760 A | * | 11/1939 | Mayo ......................... | 165/43 X |
| 2,193,835 A | * | 3/1940 | Murphy et al. ............. | 165/202 |
| 2,263,476 A | * | 11/1941 | Sunday ........................ | 165/43 |
| 2,266,986 A | * | 12/1941 | Murphy ....................... | 165/203 |
| 2,476,295 A | * | 7/1949 | Hans ........................... | 165/203 |
| 2,660,407 A | * | 11/1953 | Lehane ................... | 165/203 X |
| 2,735,657 A | * | 2/1956 | Owen ....................... | 165/43 X |
| 2,773,360 A | * | 12/1956 | Baker et al. .............. | 165/43 X |
| 2,922,290 A | * | 1/1960 | Carraway ................. | 165/43 X |
| 3,990,505 A | * | 11/1976 | Davenport ................... | 165/43 |
| 4,385,503 A | * | 5/1983 | Okura ....................... | 165/43 X |
| 4,391,320 A | | 7/1983 | Inoue et al. | |
| 4,473,109 A | * | 9/1984 | Kojima et al. .............. | 165/203 |
| 4,679,616 A | * | 7/1987 | Ferdows et al. .............. | 165/43 |
| 4,682,649 A | * | 7/1987 | Greer .......................... | 165/43 |
| 4,856,710 A | * | 8/1989 | Takada et al. ............ | 165/43 X |
| 5,803,166 A | * | 9/1998 | Ito et al. ..................... | 165/203 |
| 6,003,593 A | * | 12/1999 | Halligan ..................... | 165/203 |
| 6,397,942 B1 | * | 6/2002 | Ito et al. ..................... | 165/203 |

* cited by examiner

Primary Examiner—Ljiljana Ciric
(74) Attorney, Agent, or Firm—Jeffrey P. Calfa; Dennis Kelly Sullivan; Susan L. Lukasik

(57) ABSTRACT

A zonal climate control system for a vehicle passenger compartment provides independent outside air mixing for zones behind the operator area. A forward zone climate unit comprises, an air circulation system having an outlet to the vehicle passenger compartment, an inlet from the vehicle passenger compartment, an inlet communicating with an outside environment, a heater core coupled to the engine driven heat source and an evaporator coupled to the engine driven air conditioning compressor. The passenger compartment further includes a rearward zone climate unit, comprising, an air circulation system having an outlet to the vehicle passenger compartment, an inlet from the vehicle passenger compartment, an inlet communicating with the outside environment through the exterior skin of the vehicle, a heater core coupled to the engine driven heat source and an evaporator coupled to the engine driven compressor. An actuable door provides for closing and opening the inlet of the rearward zone climate unit communicating with the outside environment. Positioning of the door is under the control of a temperature sensor for the rearward zone. A pressure sensitive check valve is positioned in the inlet of the rearward zone climate unit from the passenger compartment.

9 Claims, 4 Drawing Sheets

AIR MIXING SYSTEM FOR AUXILIARY VEHICLE HVAC UNITS

BACKGROUND OF THE INVENTION

1. Field of the Invention

The present invention relates to motor vehicle cabin climate control and more particularly to a system for mixing outside and recirculated inside air for secondary climate control zones in vehicles having multiple zones for heating, ventilation and air conditioning (HVAC) control.

2. Description of the Problem

Motor vehicles having relatively large passenger cabins, such as extended cab trucks and recreational vehicles, often provide zonal heating and cooling for different sections of the cabin. Separating heating and cooling functions by zone allows heating and cooling to be limited to those zones that are in use, reducing the load on the heating and cooling plants, particularly the compressor for air conditioning. Typically the zones are arranged from front to back of the vehicle. Each zone will have an independent HVAC unit, located in its own merged heating and cooling air circulation system to reduce the quantity and cost of duct work. HVAC units comprise a blower, an evaporator and a heater core. One air conditioning compressor typically serves all of the evaporators.

The forward operator area is typically provided with an HVAC unit which has vent controls allowing air to be drawn from within the cabin (recirculation air), which can be heated or cooled more quickly, or allowing air to be drawn from outside the vehicle to freshen the air within the cabin. Rapid cooling of a zone is obtained by recirculating cabin air rather than drawing in outside air. When freshening of the air in the operator area is desired, outside air can usually be conveniently drawn through a grill placed just ahead of and under the front windshield of the vehicle. Zones located toward the rear of the cabin have typically drawn only inside air, in part due to the concern for the load being place on the air conditioning compressor and in part due the lack of a convenient access to outside air. However, it is desirable to provide fresh air mixing for all zones as an enhancement to passenger comfort, if it can be done without placing an excessive load on the air conditioning compressor.

SUMMARY OF THE INVENTION

According to the invention there is provided a zonal climate control system for a vehicle passenger compartment. Each zone is independently controlled. The zones rely on the same engine driven heat source, usually the engine cooling system and one engine driven heat pump or air conditioning compressor. The zones are arranged longitudinally with a forward zone climate unit corresponding to the operator area of the vehicle. The forward zone climate unit comprises, an air circulation system having an outlet to the vehicle passenger compartment, an inlet from the vehicle passenger compartment, an inlet communicating with an outside environment, a heater core coupled to the engine driven heat source and an evaporator coupled to the engine driven compressor. The passenger compartment further includes a rearward zone climate unit, comprising, an air circulation system having an outlet to the vehicle passenger compartment, an inlet from the vehicle passenger compartment, an inlet communicating with the outside environment through the exterior skin of the vehicle, a heater core coupled to the engine driven heat source and an evaporator coupled to the engine driven compressor. An actuable door provides for closing and opening the inlet of the rearward zone climate unit communicating with the outside environment. Positioning of the door is under the control of a temperature sensor for the rearward zone. A pressure sensitive check valve is positioned in the inlet of the rearward zone climate unit from the passenger compartment.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
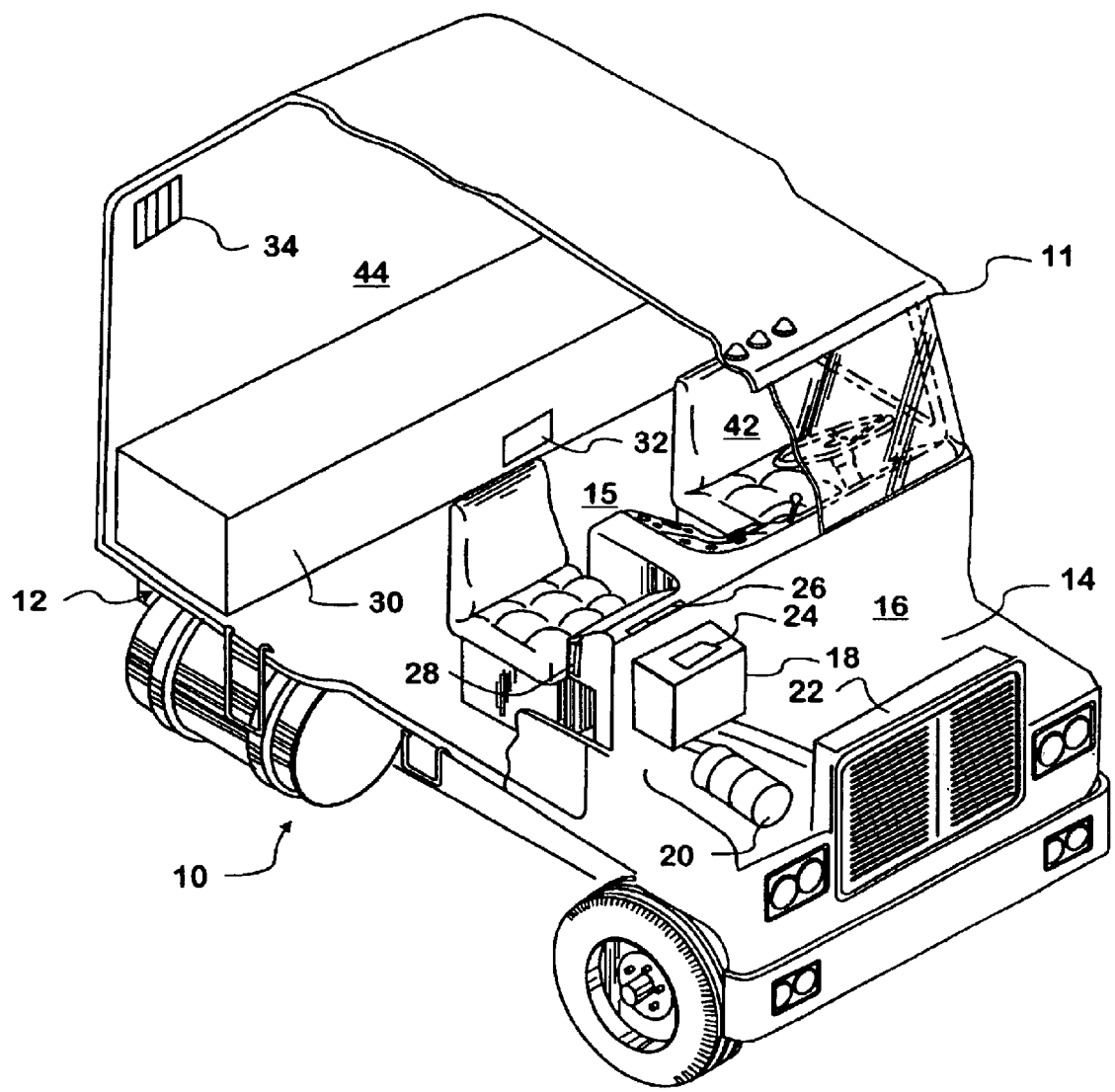
FIG. 1 is a perspective view of a truck on which the heating, ventilation and air conditioning system of the invention is installed.

Referring now to the figures and particularly to FIG. 1, a truck 10 is shown on which the heating, ventilation and air conditioning system of the invention is advantageously installed. Truck 10 comprises a cab 11 which rests on a frame 12. An engine compartment 14 is separated from a passenger compartment 15 by a dash panel 16. Supported on dash panel 16 is a forward zone HVAC unit 18. Located in engine compartment 14 is an engine driven air conditioning compressor 20 and a engine cooling system 22. Compressor 20 pumps out heat drawn from passenger compartment 15. Engine cooling system 22 may be tapped to transfer excess heat from a vehicle engine to passenger compartment 15.

HVAC unit 18 communicates with passenger compartment 15 through dash panel 16. Unit 18 includes an evaporator coupled with compressor 20 for the circulation of refrigerant and an heater core coupled with cooling system 22 for the circulation of engine coolant. Air may be drawn into the unit from an outside air duct 24 or from an inside, recirculation duct 28. Treated air is exhausted into passenger compartment through a number of ducts including vent 26. HVAC unit 18 provides heating, ventilation and cooling to the forward zone 42 of passenger compartment 15.

A secondary HVAC unit is located within a rear storage compartment or bunk 30 located in a rearward zone 44 of passenger compartment 15. The secondary HVAC unit has a recirculation inlet 32 drawing air from the lower part of rearward zone 44 and an outlet 34 into the upper part of the rearward zone.

Figure 2:
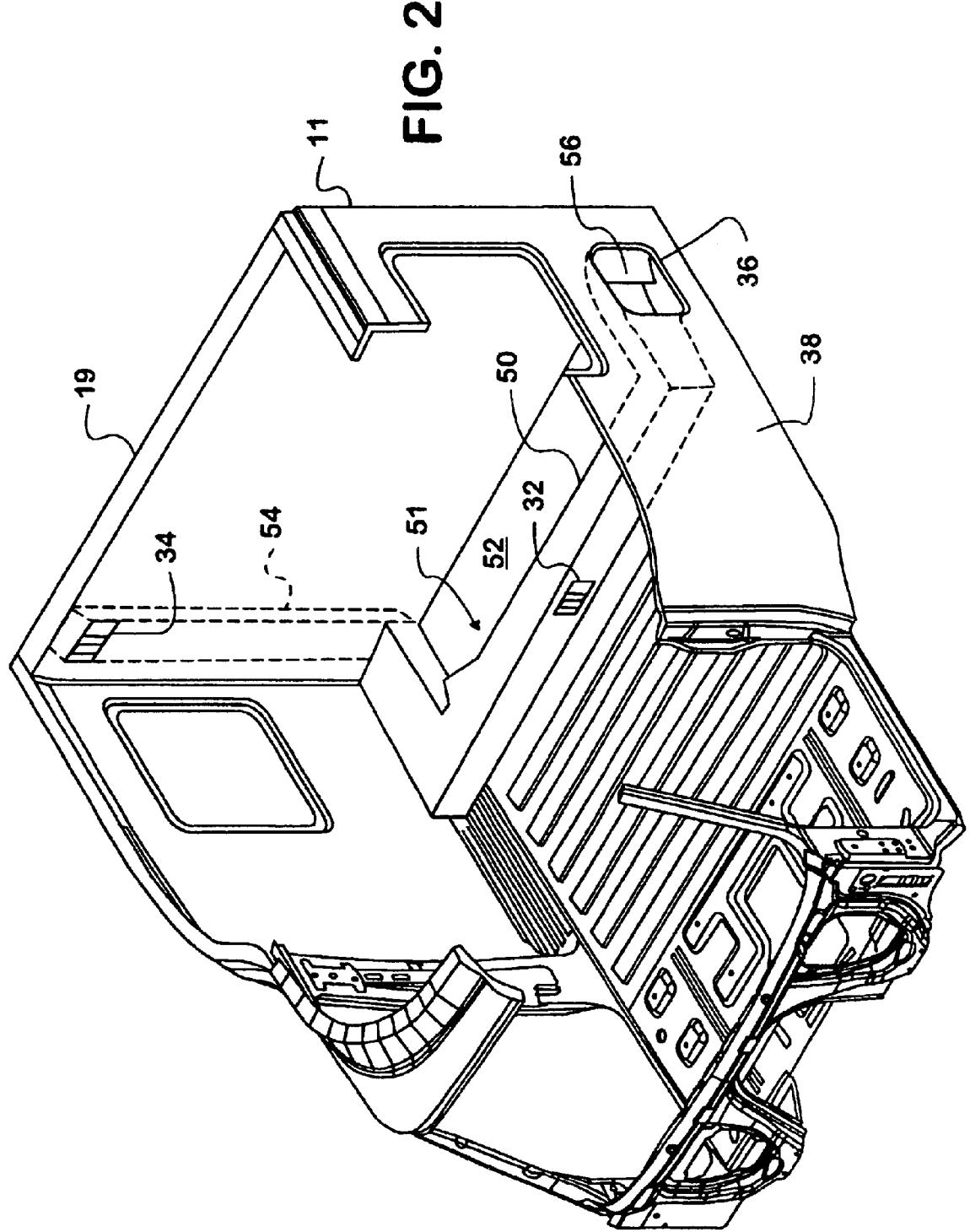
FIG. 2 is a perspective view of a truck cab showing the location of a rear zone heating, ventilation and air conditioning unit.
Figure 3:
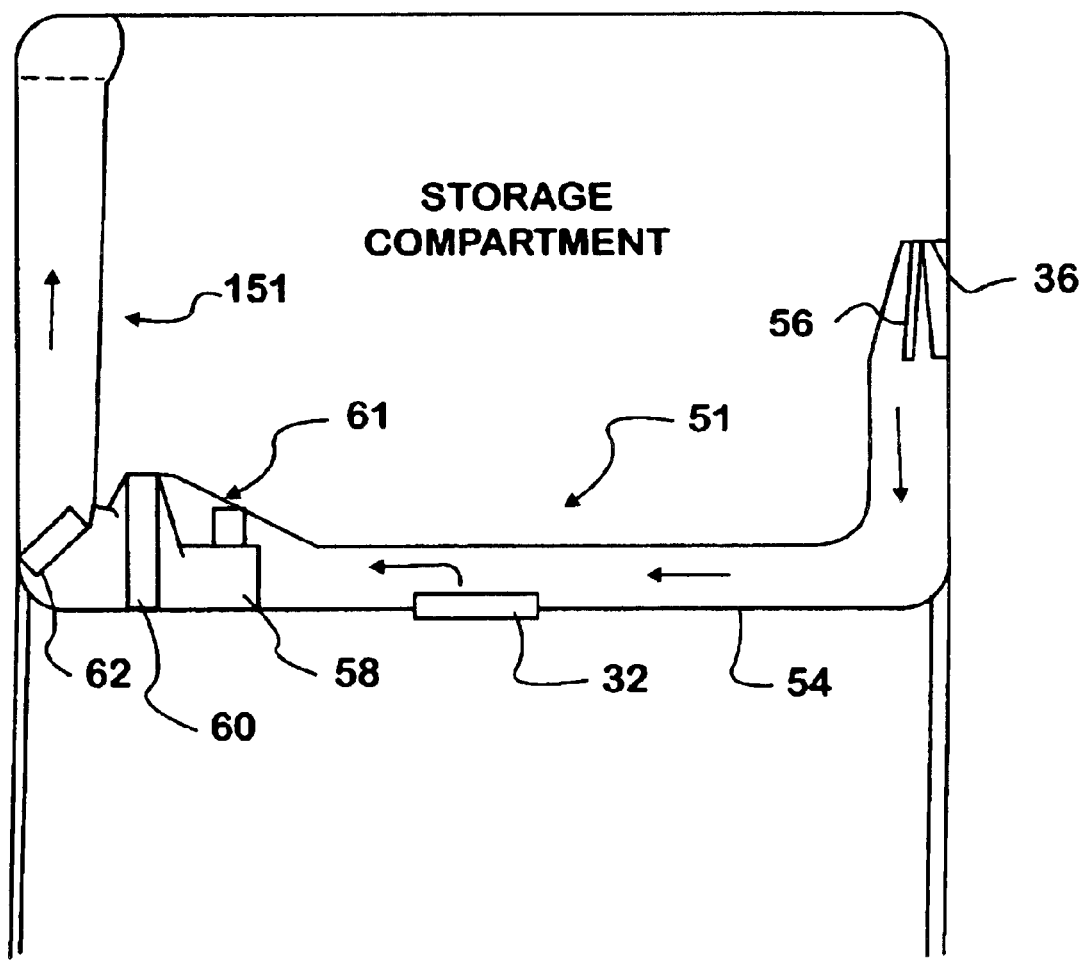
FIG. 3 is a top plan view of the heating, ventilation and air conditioning unit for the rear zone of a vehicle passenger compartment.

Referring now to FIGS. 2 and 3, a rear zone air intake duck system 51 is illustrated positioned in a stripped down cab 11, located toward the rear of the cab and primarily on a floor 52 of the cab. A rear zone circulation duct system 151 includes a riser section 54 in the back wall 19. Intake duct duck system 51 includes two inlets. Rear zone circulation duct system 151 has one outlet 34. Inlet 36 is positioned to draw air from inside the vehicle, and inlet 36 is located through the exterior skin 38 of cab 11. Inlet 36 is a NACA (National Advisory Committee for Aeronautics) type ram duct, which may be variably opened or closed by positioning of door 56. Air is forced or drawn through duct system 51 in the direction indicated by the arrows from the inlets 36 and 32 through a blower 58 into an evaporator 60 and a heater core 62. Blower 58, evaporator 60 and heater core 62 form a rear zone or secondary HVAC unit 61.

Figure 4:
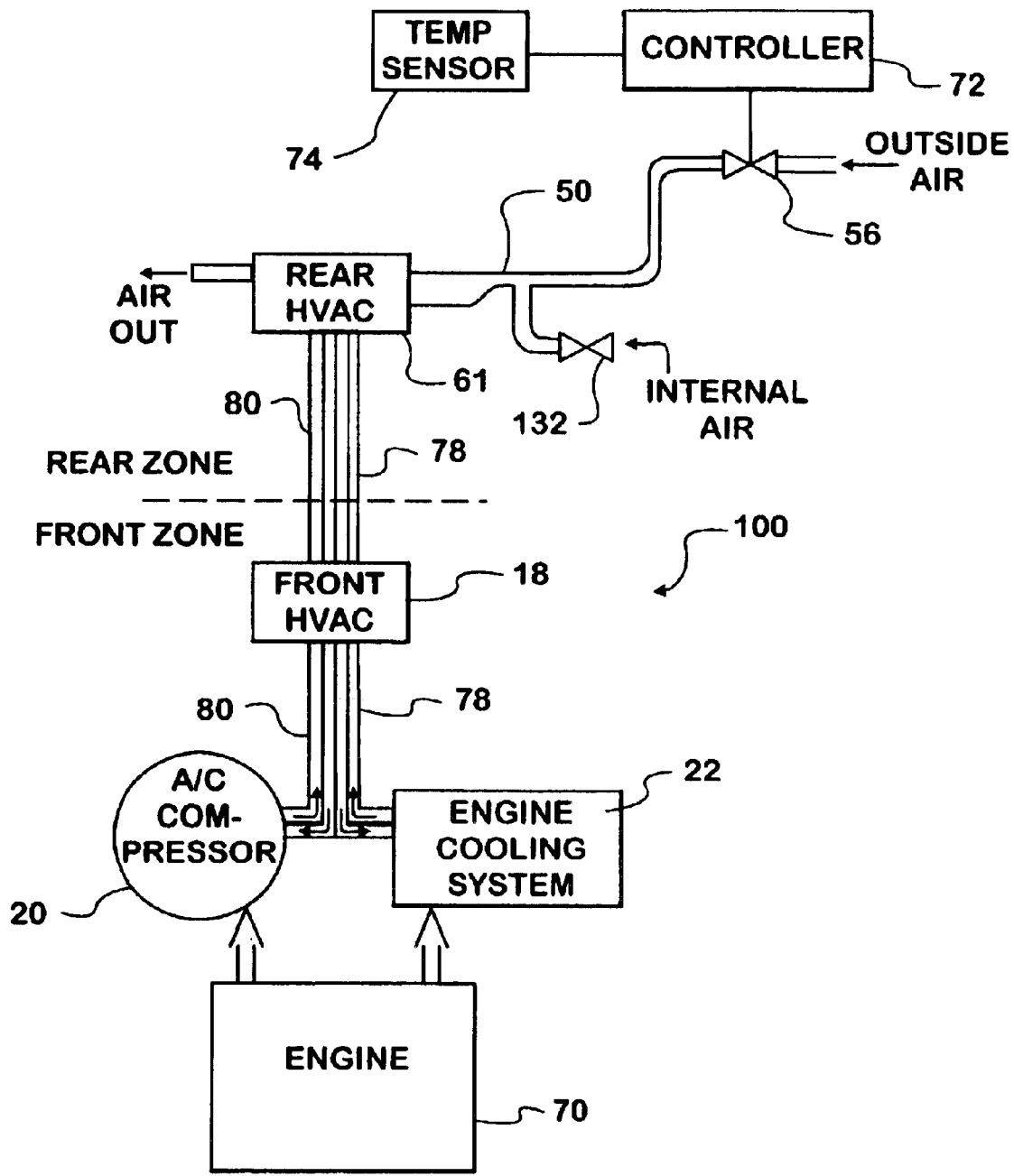
FIG. 4 is a schematic view of the heating, ventilation and air conditioning system for a vehicle.

FIG. 4 illustrates schematically a climate control system 100 for a two zone vehicle passenger compartment utilizing front and rear HVAC units 18 and. The prime mover for climate control system is the vehicle engine, which supplies excess heat to an engine cooling system 22 and which drives an air conditioning compressor 20 on demand. The cooling system 22 supplies heated engine coolant through a pipe 78 to front and rear HVAC units 18 and 61. Compressor 20 supplies refrigerant through pipe 80 to front and rear HVAC units 18 and 61. Rear HVAC unit 61 draws air from inlet ducts which are controlled by valves. Door 56 provides the valve which controls the quantity of air drawn through inlet 36, while a check valve 132 is positioned in inlet 32. Check valve 132 only passes air when the pressure deficit in duct 50 falls sufficiently below the ambient pressure to pull the valve open against gravity. All things being equal, check valve 132 will admit progressively more air to channel 50 as door 56 is progressively closed, other conditions being equal.

The position of door 56 is set by a controller 72 in response to temperature sensed by temperature sensor 74. Controller 72 operates to open door 56 progressively during air conditioning as cabin temperature decreases toward a thermostat set point. In effect, as less and less work required to cool the outside air to the desired degree, the greater the amount of outside air is mixed with the inside air. The greater the degree to which door 56 is open, the less the pressure drop inside duct 50 and the greater the degree to which check valve 132 is closed.

The invention provides a truck HVAC system, which provides fresh air mixing for all zones of a motor vehicle climate control system. While the invention is shown in only one of its forms, it is not thus limited but is susceptible to various changes and modifications without departing from the spirit and scope of the invention.

What is claimed is:

1. A zonal climate control system for a vehicle passenger compartment, comprising:
   an engine cooling system;
   an air conditioning compressor;
   a forward zone heating, ventilation and air conditioning unit, coupled to the engine cooling system to draw heat therefrom and to the air conditioning compressor to discharge heat thereto;
   an rearward zone heating, ventilation and air conditioning unit, coupled to the engine cooling system to draw heat therefrom and to the air conditioning compressor to discharge heat thereto;
   a first inside air intake duct from the vehicle passenger compartment to the forward zone heating, ventilation and air conditioning unit;
   a second inside air intake duct;
   a first exterior air intake duct into the forward zone heating, ventilation and air conditioning unit;
   a second exterior air intake duct;
   a common duct system connecting the second inside air intake duct and the second exterior air intake duct to the rearward zone heating, ventilation and air conditioning unit;
   at least a first vent for transporting air exhausted air from the forward zone heating, ventilation and air conditioning system unit into vehicle passenger compartment; and
   at least a first vent for transporting air exhausted from the rearward zone into the vehicle passenger compartment.

2. A zonal climate control system as set forth in claim 1, further comprising:
   a positionable door located in the second exterior air intake duct for controlling the intake of air through the second exterior air intake duct; and
   a check valve responsive to air pressure in the common duct system and located in the second inside air intake duct for controlling the intake of air from the vehicle passenger compartment.

3. A zonal climate control system as set forth in claim 2, further comprising a temperature sensor in vehicle passenger compartment and a controller responsive to temperature as sensed by the temperature sensor for moving the positionable door as a function of cabin temperature.

4. A motor vehicle, comprising:
   a cab having an exterior skin;
   a passenger compartment enclosed by the cab;
   a front climate zone of the passenger compartment;
   a rear climate zone of the passenger compartment;
   an engine cooling system;
   an air conditioning compressor;
   a primary heating, ventilation and air conditioning unit for the forward climate zone comprising, an air circulation system having an outlet to the front climate zone, an air intake inlet from the front climate zone, an air intake inlet communicating with an outside environment, the primary heating, ventilation and air conditioning unit being coupled to the engine cooling system and to the air conditioning compressor; and
   an auxiliary heating, ventilation and air conditioning unit, comprising, an air circulation system having an outlet to the rear climate zone, an air intake inlet from the rear climate zone, an air intake inlet communicating with the outside environment through the exterior skin, and a door positionable in the air intake inlet communicating with the outside environment for controlling the quantity of air drawn there through, the auxiliary heating, ventilation and air conditioning unit being connected to the engine cooling system and to the air conditioning compressor.

5. A motor vehicle as set forth in claim 4, wherein the inlet through the exterior skin is formed in part from a NACA duct.

6. A motor vehicle as set forth in claim 5, further comprising:
   a temperature sensor for the rear climate zone; and
   a controller responsive to the temperature sensor for positioning the positionable door.

7. A motor vehicle as set forth in claim 6, further comprising:
   a check valve in the air intake inlet from the rear climate zone.

8. A motor vehicle as set forth in claim 7, the passenger compartment being provided within an extended cab truck.

9. A motor vehicle as set forth in claim 8, further comprising:
   a bunk;
   the auxiliary heating, ventilation and air conditioning unit being located in the bunk.

* * * * *